United States Patent [19]

Saegusa

[11] Patent Number: 4,841,167

[45] Date of Patent: Jun. 20, 1989

[54] CLOCK RECOVERING DEVICE

[75] Inventor: Noboru Saegusa, Tokyo, Japan

[73] Assignee: NEC Corporation, Tokyo, Japan

[21] Appl. No.: 89,794

[22] Filed: Aug. 27, 1987

[51] Int. Cl.[4] .......................... H03K 5/13; H03K 1/17
[52] U.S. Cl. .................................... 307/269; 307/518; 328/63; 328/109; 328/139; 375/119
[58] Field of Search ...................... 307/269, 480, 518; 328/133, 63, 72, 109, 139; 375/119, 120; 377/106; 331/1 A

[56] References Cited

U.S. PATENT DOCUMENTS 3,988,696 10/1976 Sharpe ................................. 375/120
4,538,119 8/1985 Ashida ................................ 331/1 A
4,546,486 10/1985 Evans .................................... 328/133
4,680,780 7/1987 Agoston et al. ...................... 375/120

Primary Examiner—Stanley D. Miller
Assistant Examiner—Richard Roseen
Attorney, Agent, or Firm—Sughrue, Mion, Zinn, Macpeak, and Seas

[57] ABSTRACT

A device for recovering a clock from received data which has a different duty ratio is disclosed. The optimum timing of a recovered clock is determined based on the pulse width of received data. A clock is accurately recovered so long as the duty ratio of received data is not greater than ±50%.

7 Claims, 6 Drawing Sheets

FIG. 6

| M | $A_2$ | $A_1$ | $A_0$ | $O_2$ | $O_1$ | $O_0$ | L |
|---|---|---|---|---|---|---|---|
| 0 | 0 | 0 | 0 | 1 | 0 | 0 | 4 |
| 1 | 0 | 0 | 1 | 1 | 0 | 1 | 5 |
| 2 | 0 | 1 | 0 | 1 | 0 | 1 | 5 |
| 3 | 0 | 1 | 1 | 1 | 1 | 0 | 6 |
| 4 | 1 | 0 | 0 | 0 | 1 | 0 | 2 |
| 5 | 1 | 0 | 1 | 0 | 1 | 1 | 3 |
| 6 | 1 | 1 | 0 | 0 | 1 | 1 | 3 |
| 7 | 1 | 1 | 1 | 1 | 0 | 0 | 4 |

CLOCK RECOVERING DEVICE

BACKGROUND OF THE INVENTION

The present invention relates to a clock recovering device and, more particularly, to a device for accurately recovering a clock from received data which has a different duty ratio of logical ONEs and logical ZEROs.

For the recovery of a clock from received data, it has been customary to detect a transition of the incoming data and, if the recovered clock is low level (or high level) at the instant of detection of a transition, retard (or advance) the phase of the recovered clock deciding that the phase is advanced (or retarded). In this manner, a prior art clock recovering device corrects the phase of a recovered clock timed to transitions of received data. However, a problem with such a device is that when the duty ratio of ONEs and ZEROs of received data is different, even if the phase of a recovered clock is greatly deviated, the phase is decided as being advanced and retarded alternately every time a transition is detected. This indefinitely prevents a clock from being correctly recovered.

SUMMARY OF THE INVENTION

It is, therefore, an object of the present invention to provide a clock recovering device capable of accurately recovering a clock from received data despite a difference of duty ratio.

It is another object of the present invention to provide a generally improved clock recovering device.

A clock recovering device of the present invention comprises an edge detector for producing a pulse when received data changes, a first counter for counting a high-speed clock which is an integral multiple times higher than a transmission rate of the received data, and reset by the pulse output by the edge detector, a logic unit for processing an output of the first counter, a second counter for receiving an output of the logic unit and reset by the pulse for counting the high-speed clock, a phase comparator for deciding a phase of recovered clock timed to a carry which is output by the second counter, and a variable frequency divider controlled in frequency division number by an output of the phase comparator for producing the recovered clock from the high-speed clock.

In accordance with the present invention, a device for recovering a clock from received data which has a different duty ratio determines the optimum timing of a recovered clock based on the pulse width of the received data. A clock is accurately recovered so long as the duty ratio of received data is not greater than ±50%.

BRIEF DESCRIPTION OF THE DRAWINGS

FIG. 6 is a chart showing data stored in a ROM (Read Only Memory) which is included in the device of FIG. 5.

DESCRIPTION OF THE PREFERRED EMBODIMENTS

Figure 1:
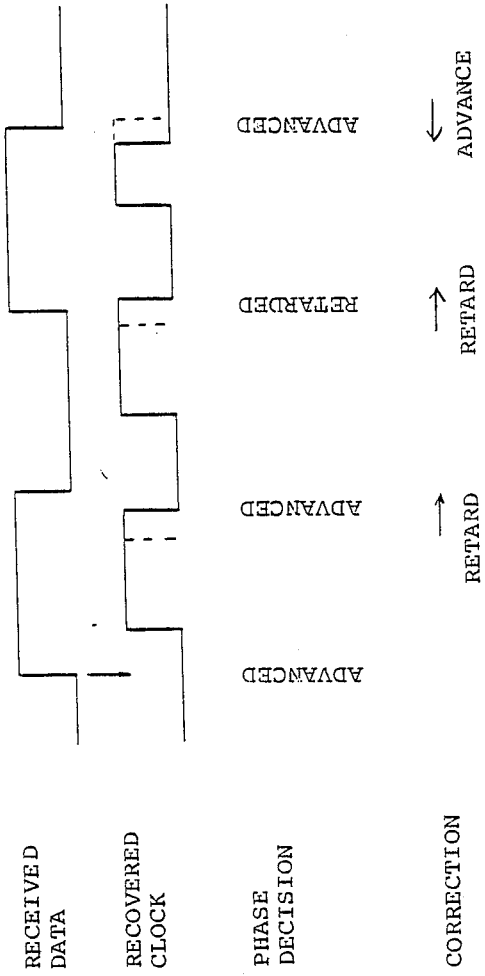
FIGS. 1 and 2 are timing charts demonstrating the operation of a prior art clock recovering device.
Figure 2:
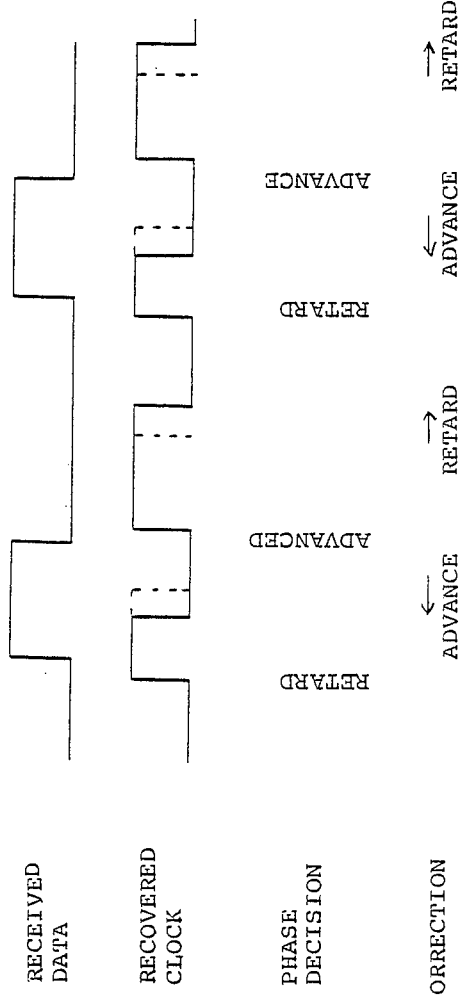

To better understand the present invention, the operation of a prior art clock recovering device will be outlined with reference to FIGS. 1 and 2. As shown in FIG. 1, it is a common practice to correct the phase of recovered clock by detecting a transition of received data and, if the recovered clock is low level at the instant of detection of a transition, retarding the phase deciding that the phase is advanced and, if it is high level, advancing the phase deciding that the phase is retarded. As previously stated, such a prior art implementation indefinitely fails to correctly recover a clock if the duty ratio is not greater than ±50%, because, as shown in FIG. 2, the phase is decided as being advanced and retarded alternately timed to the transitions of received data even if the phase of the recovered clock is greatly deviated.

Figure 3:
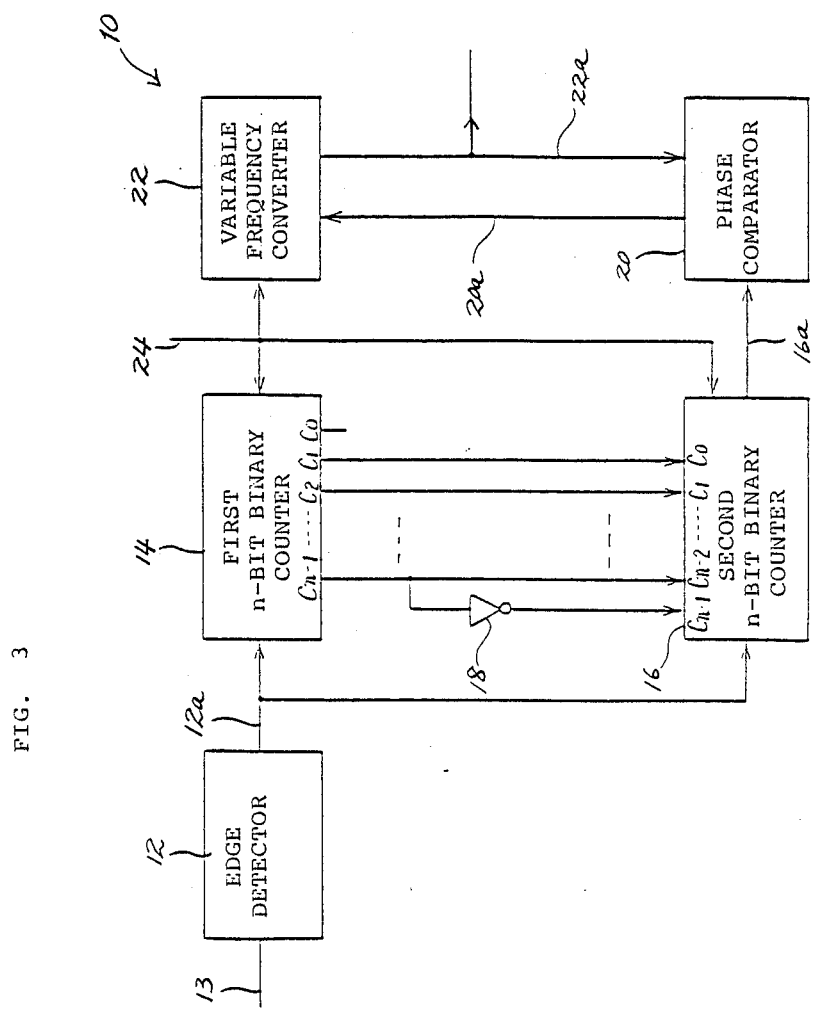
FIG. 3 is a block diagram showing a clock recovering device embodying the present invention.

Referring to FIG. 3, a clock recovering device embodying the present invention and which is free from the drawback discussed above is shown. The clock recovering device, generally 10, comprises an edge detector 12 to which received data 13 is applied, a first n-bit binary counter 14 which is supplied with an output 12a of the edge detector 12, a second n-bit binary counter 16 which is also supplied with the output 12a of the edge detector 12, an inverter 18 connected to the first n-bit binary counter 14, a phase comparator 20 to which an output 16a of the second n-bit binary counter 16 is coupled, and a variable frequency divider 22 which receives an output 20a of the phase comparator 20 and, in turn, feeds its output 22a to the phase comparator 20.

Figure 4:
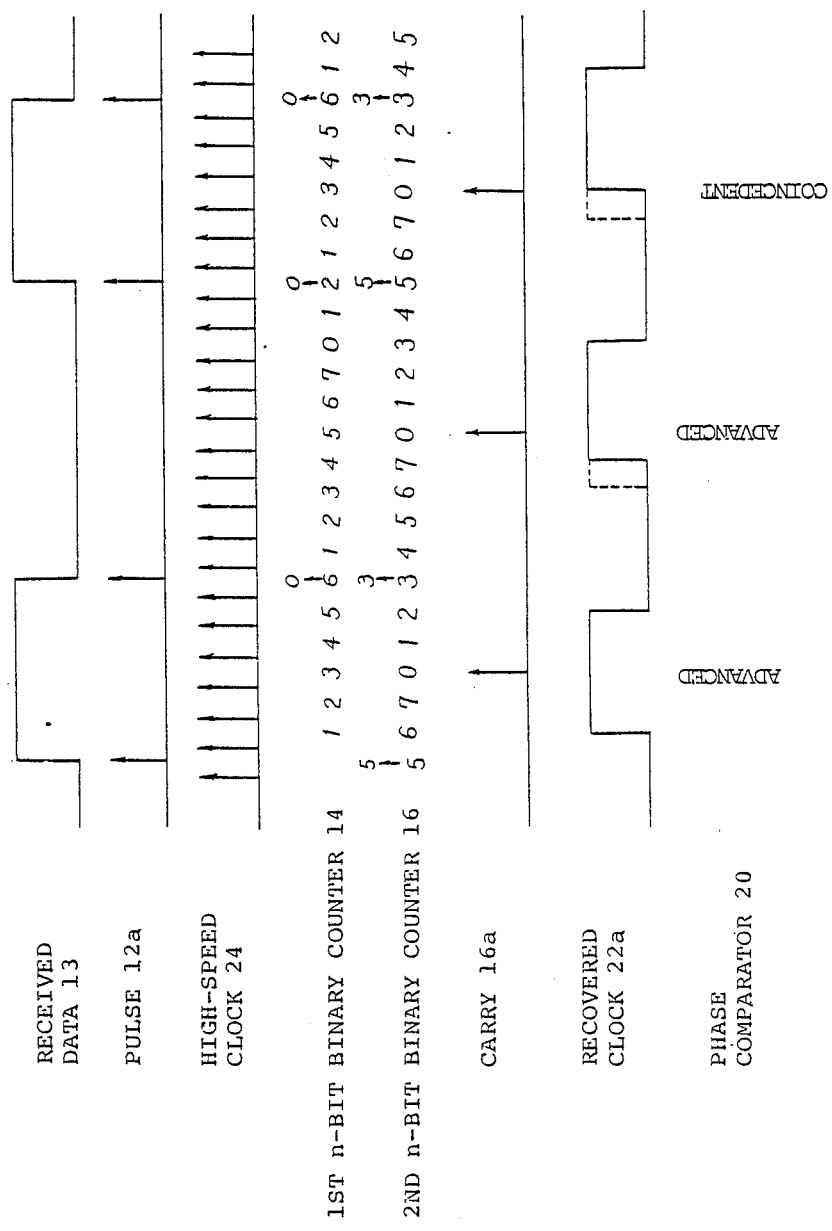
FIG. 4 is a timing chart representative of the operation of the clock recovering device in accordance with the present invention.

The operation of the clock recovering device 10 will be described with reference to FIG. 4. In the figure, "n" is assumed to be 3.

Assume that the width of a logical high or a logical low pulse of the received data 13 is $T_p$, the period of the received data 13 is $T_o$, and the deviation of duty is greater than $-50\%$ and smaller than $+50\%$. Then, if the data length is 1, the timing of recovered clock is $0.5 T_p$ before because $T_p$ is equal to or greater than $0.5 T_o$ and smaller than $1.5 T_o$; if the data length is 2, the timing of recovered clock is $0.5 (T_p - T_o)$ before because $T_p$ is equal to or greater than $1.5 T_o$ and smaller than $2.5 T_o$; if the data length is 3, the timing of recovered clock is $0.5 (T_p - 2 T_o)$ before because $T_p$ is equal to or greater than $2.5 T_o$ and smaller than $3.5 T_o$; and if the data length is m, the timing of recovered clock is $0.5 [T_p - (m-1) T_o]$ before because $T_p$ is equal to or greater than $(m - 0.5) T_o$ and smaller than $(m + 0.5) T_o$.

Upon transition of the received data 13 from high to or low or vice versa, the edge detector 12 produces a pulse 12a. The first n-bit binary counter 14 counts a high-speed clock 24 which is $2^n$ times higher than the transmission rate of received data. The counter 14 is reset by each pulse 12a to reach the same count at every period T, so that the count $\iota$ immediately before resetting is produced by:

$$\iota \cdot \frac{T_O}{2^n} = T_P - (m - 1) T_O,$$

(when $(m - 0.5) T_O \leq T_P < m T_O$)

-continued $$(2^n + l)\frac{T_O}{2^n} = T_P - (m - 1) T_O,$$

(when $mT_O \leq T_P < (m + 0.5) T_O$)

Since a relation $2^{n-1} \leq l < 2^n - 1$ holds under a condition of $(m-0.5)T_o < T_p < mT_o$ and a relation $0 \leq l < 2^{n-1}$ holds under a condition of $mT_o \leq T_p < (m+0.5)T_o$, the timing of recovered clock is expressed as:

$$0.5[T_P - (m - 1) T_O] = \frac{T_O}{2^n}(0.5\,l), \text{ (where } l \geq 2^{n-1})$$

$$= \frac{T_O}{2^n}(0.5\,l + 2^{n-1}), \text{ (where } l < 2^{n-1})$$

As shown in FIG. 3, the "n−1" to "1" bit outputs of the first n-bit binary counter 14 are connected to, respectively, the "n−2" to "0" bit inputs of the second n-bit binary counter 16. Further, the "n−1" bit output of the first counter 14 is connected to the "n−1" bit input of the second counter 16 by way of the inverter 18. Assuming that the value read in response to the pulse 12a is K, there holds an equation:

$$0.5[T_P - (m - 1) T_O] = \frac{T_O}{2^n} \cdot K,$$

$$\left( \text{let the error of } \frac{T_O}{2^{n+1}} \text{ be neglected} \right)$$

Hence, what is stored in the second n-bit binary counter 16 is a time interval between the optimum timing of recovered clock and a transition of received data.

Since the second n-bit binary counter 16 continuously counts the high-speed clock 24, its carry 16a coincides in timing with the optimum timing of recovered clock. The carry 16a and the recovered clock 22a are fed to the phase comparator 20 which then decides the phase of the recovered clock 22a and produces a phase correct signal 20a. In response, the variable frequency divider 22 changes the frequency division number to thereby correct the phase of the recovered clock 22a.

Figure 5:
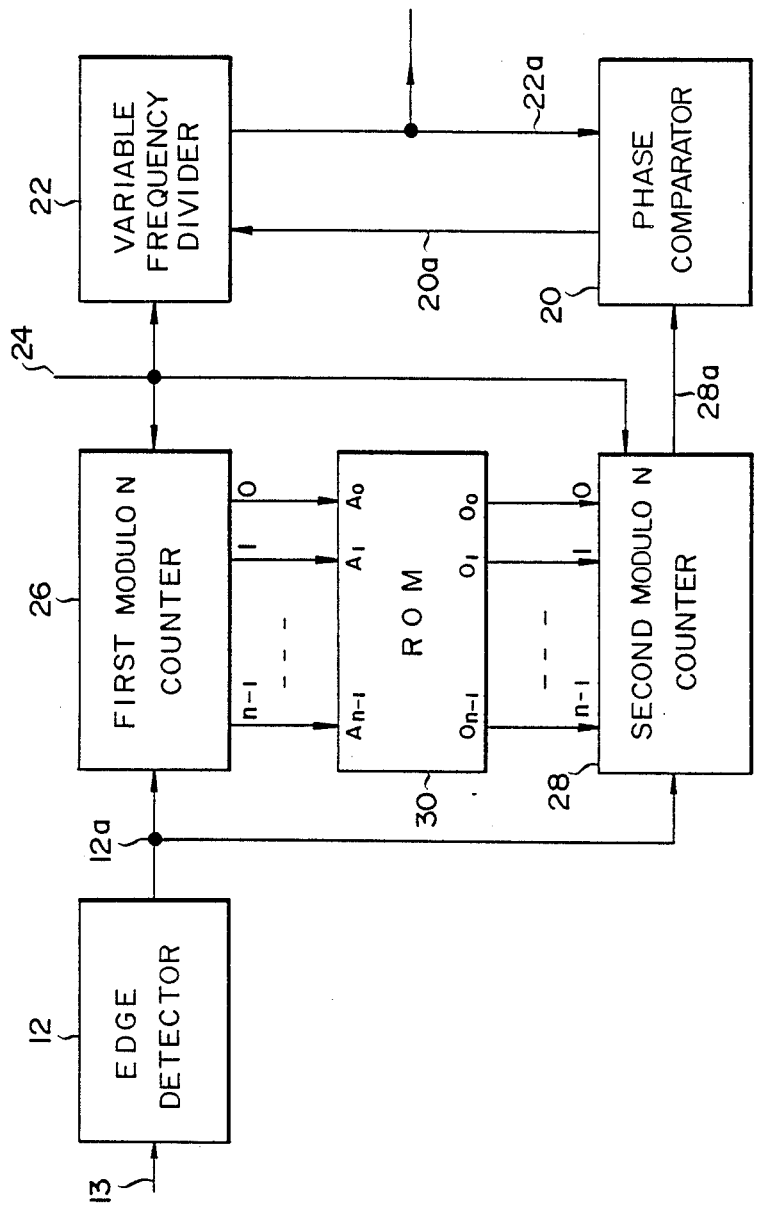
FIG. 5 is a block diagram showing another embodiment of the present invention.

Referring to FIG. 5, another embodiment of the present invention is shown. This embodiment is essentially the same in construction as the embodiment of FIG. 3 except for the provision of a first and a second modulo N counter 26 and 28 and a ROM 30 which serves as a decoder. By the operation which will be described, the clock recovering device of FIG. 5 recovers a clock in the same manner as the device of FIG. 3, when N is 8. The ROM 30 computes L=0.5N+0.5M (where M<0.5N) and L=0.5M (where M>0.5N) based on a count m of the first N-bit counter 26.

Turning back to FIG. 4, as the received data 13 changes from high to low or vice versa, the edge detector 12 produces a pulse 12a. Counting the high-speed clock 24 which is N times higher than the received data transmission rate, the first N modulo counter 26 is reset by each pulse 12a to reach the same count at each period T. Hence, the count M immediately before resetting is produced by:

$$T_P - (m - 1) T_O = M \cdot \frac{T_O}{N}$$

(when $(m - 0.5) T_O \leq T_P < mT_O$)

$$= (N + M) \cdot \frac{T_O}{N}$$

(when $mT_O \leq T_P < (m + 0.5) T_O$)

Since M is the count of the N-bit counter, relations $M \geq 0.5N$ and $M < 0.5N$ hold under conditions of $(m-0.5)T_o \leq T_p < mT_o$ and $mT_o \leq T_p \leq (m+0.5)T_o$, respectively. Further, there holds an equation:

$$T_P - (m - 1) T_O = M \cdot \frac{T_O}{N} \text{ (where } M \geq 0.5N)$$

$$= (N + M) \cdot \frac{T_O}{N} \text{ (where } M < 0.5N)$$

Therefore, the timing of recovered clock is produced by:

$$0.5[T_P - (m - 1) T_O] = 0.5M \cdot \frac{T_O}{N} \text{ (where } M \geq 0.5N)$$

$$= (0.5N + 0.5M)\frac{T_O}{N}$$

(where $M < 0.5N$)

The "0", "1", ..., "n−1" bit outputs of the first modulo N counter 26 are fed to, respectively, the "$A_0$", "$A_1$", ..., "$A_{n-1}$" bits of the ROM 30. The ROM 30 computes L=0.5M (M≥0.5N) and L=0.5N+0.5M (M<0.5N) (data stored in the ROM 30 when N is 8 are shown in FIG. 6), the results appearing on the "$O_0$", "$O_1$", ..., "$O_{n-1}$" bits. The second modulo N counter 28, therefore, is loaded with a time interval between the optimum timing of recovered clock and a transition of received data.

Since the second modulo N counter 28, too, has a period of $T_o$, its carry 28a coincides in timing with the optimum timing of recovered clock. Subsequently, as in the first embodiment, the carry 28a and the recovered clock 22a are applied to the phase comparator 20. In response, the phase comparator 20 decides the phase of the recovered clock 22a and, then, produces a phase correct signal 20a. The variable frequency divider 22 changes the frequency division number by using the phase correct signal 20a, thereby correcting the phase of the recovered clock 22a.

In summary, it will be seen that the present invention provides a clock recovering device which accurately recovers a clock if the duty ratio of received data is not greater than ±50%, because it determines the optimum timing of recovered clock based on the pulse width of received data.

Various modifications will become possible for those skilled in the art after receiving the teachings of the present disclosure without departing from the scope thereof.

What is claimed is:

1. A clock recovering device comprising:
    an edge detector means for producing a pulse when received data changes;
    a first counter means for counting a high-speed clock which is an integral multiple times higher than a transmission rate of the received data, and reset by the pulse output of said edge detector means;

a logic means for processing an output of said first counter means;

a second counter means for receiving an output of said logic means and reset by the pulse output for counting the high-speed clock;

a phase comparator means for deciding a phase of recovered clock by comparing the recovered clock with a carry which is output by said second counter means; and a variable frequency divider means controlled in frequency division number by an output of said phase comparator means for producing the recovered clock from the high-speed clock.

2. A clock recovering device as claimed in claim 1, wherein said first counter means comprises a first n-bit binary counter for counting a high-speed clock which is $2^n$ times higher than the transmission rate of the received data, and reset by the pulse.

3. A clock recovering device as claimed in claim 2, wherein said logic means comprises an inverter for inverting an "n−1" bit output of said first n-bit binary counter.

4. A clock recovering device as claimed in claim 3, wherein said second counter means comprises a second n-bit binary counter having an "n−1" bit input to which an output of said inverter is connected and an "n−2" to a "0" bit input to which an "n−1" to a "1" bit output of said first n-bit binary counter are respectively connected, so as to read data in response to the pulse, and counting the high-speed clock.

5. A clock recovering device as claimed in claim 1, wherein said first counter means comprises a first modulo N counter for counting a high-speed clock which is N times higher than the transmission rate of the received data, and reset by the pulse.

6. A clock recovering device as claimed in claim 5, wherein said logic means comprises a decoder for computing $L=0.5N+0.5M$ ($M<0.5N$) and $L=0.5M$ ($M>0.5N$) by using a count M of said first modulo N counter.

7. A clock recovering device as claimed in claim 6, wherein said second counter means comprises a second modulo N counter for counting the high-speed clock and set to an initial value L by the pulse.

* * * * *

UNITED STATES PATENT AND TRADEMARK OFFICE
CERTIFICATE OF CORRECTION

PATENT NO. : 4,841,167

DATED : June 20, 1989

INVENTOR(S) : Noboru Saegusa

It is certified that error appears in the above-identified patent and that said Letters Patent is hereby corrected as shown below:

On the face of the Patent, please insert the priority information as follows:

--[30] Foreign Application Priority Data

Aug. 27, 1986      [JP] Japan . . . . . . 61-199039--

At column 3, line 65, delete "N modulo" and insert --modulo N--

Signed and Sealed this

Twenty-fourth Day of April, 1990

Attest:

HARRY F. MANBECK, JR.

*Attesting Officer*          *Commissioner of Patents and Trademarks*